Sept. 17, 1963    I. LETICA    3,103,705
MASTER DIE ASSEMBLY
Filed Oct. 9, 1962    3 Sheets-Sheet 3

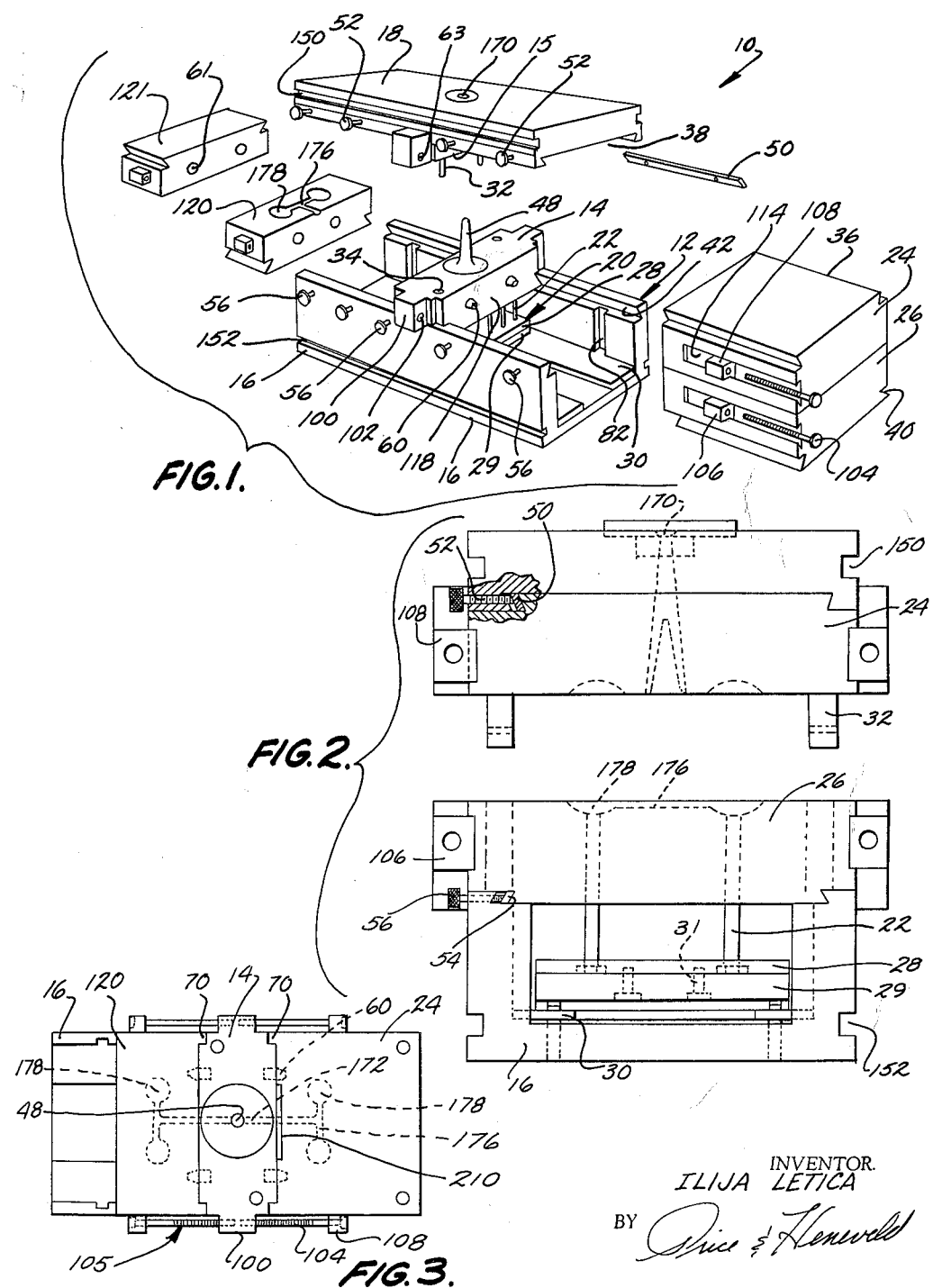

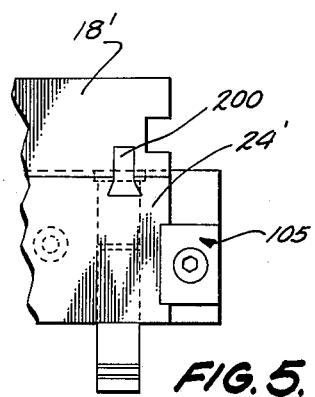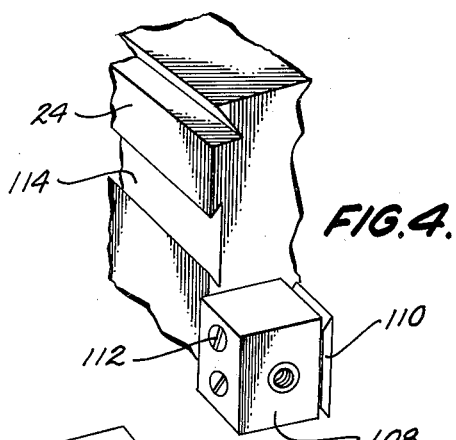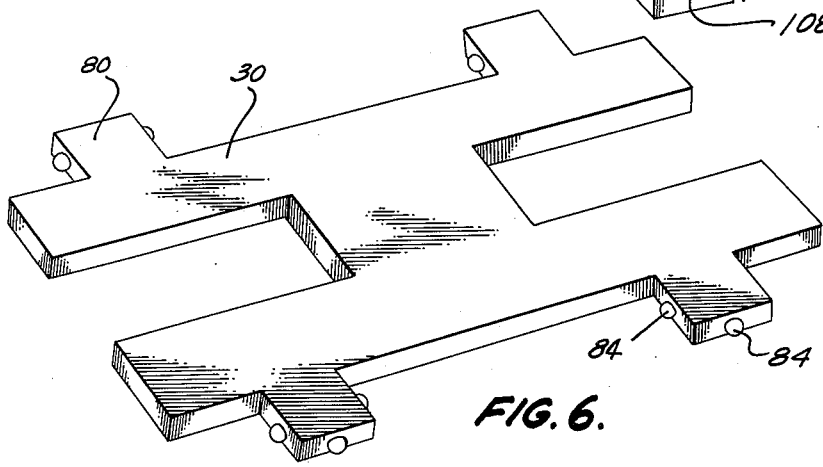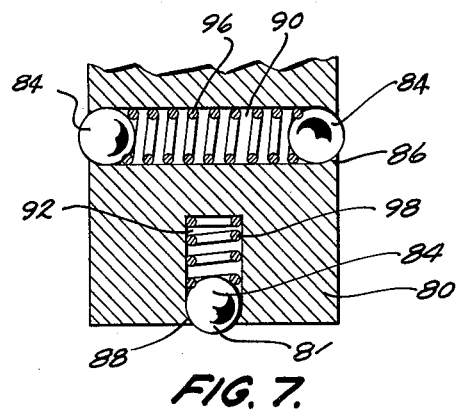

INVENTOR.
ILIJA LETICA
BY
ATTORNEYS

United States Patent Office 3,103,705
Patented Sept. 17, 1963

3,103,705
MASTER DIE ASSEMBLY
Ilija Letica, Greenville, Mich., assignor to I & G Mold Corporation, Grand Ledge, Mich., a corporation of Michigan
Filed Oct. 9, 1962, Ser. No. 229,304
8 Claims. (Cl. 18—42)

This invention relates to a mold or die assembly for injection plastic molding or metal die casting, and more particularly to a master mold assembly allowing rapid convenient assembly and disassembly, and enabling interchangeable use of various length mold or die insert blocks.

It should be understood from studying the following specification and the drawings that the inventive assembly can be readily utilized for die casting processes or for plastic injection molding processes. In the drawings, a "die" assembly suitable for die casting metals is shown including a sprue spreader (FIG. 1). However, since the inventive concept is equally applicable to so-called "mold" assemblies for plastic injection molding, these terms are usually intended as interchangeable. Such adopted terminology is therefore not to be limiting in nature, but is used because the terms are standard expressions used by those in these two closely related fields.

The components of a mold assembly for injection plastic molding or of a correlative die assembly for die casting are very expensive, as is well-known. Accordingly, in the last few years, master mold assemblies have been adopted which enable one molding frame to receive a variety of the relatively expensive mold block inserts having the mold cavities therein. These block inserts are all of the same length today in order to be clamped firmly into the holder by the conventional end clamps, and to match tapped sockets for the plurality of bolts used to connect the inserts into the holding frame. Since all of the inserts must extend exactly to the end of the holding frame for proper clamping, die casters or injection molders must necessarily purchase inserts of this length and no shorter, even though only a portion of this length may actually be needed for a particular use. This extra unused length represents a substantial initial cost, a waste of materials, and a waste of valuable inventory space.

Another known disadvantage which results in lost production time in such processes is the complexity of the present master mold assemblies and the multiplicity of operations necessary to disassemble and re-assemble the apparatus to exchange inserts during changeover. Several bolts and clamps from different angles must be removed. Further, the inserts often tend to bind in the holder after being subjected to the high temperature involved. This is caused by the tight interfitting of tongue and groove joints between the parts. These must be tight to prevent insert movement under pressure during operation, especially under the high pressures of metal die casting. Even with all of these tightly fitting parts, bolts from every angle, and clamps on the outer ends, however, the present insert blocks still tend to shift slightly under the tremendous die casting pressures often necessary. This shifting causes an undesirable, often ruinous, seam line on the cast articles where the upper and lower die cavity portions in the two inserts meet.

Another limitation of present master die assemblies occurs with fixed core pins used to form a hollow interior for molded articles, and surrounding ejection sleeves. Presently, these core pins can be exchanged in the assembly only by removing the entire molding assembly from the molding press, then removing the pins from the bottom of the holder, then inserting different pins in a different pattern through openings in the bottom to match a particular new arrangement of mold cavities, and then replacing the assembly back in the press. This is time consuming and costly. None of the present devices known are capable of enabling rapid, convenient exchange of the entire set of die pins for another set without removing the assembly from the molding press.

Thus, it will be noted that although master die assemblies have indeed lowered the required inventory for die casting or injection plastic molding, the actual exchange of inserts in the known die assemblies is a time consuming process requiring the removal of several pins, studs, clamps, etc. Further, the inserts often bind in the holders. If the tongue and groove joints are made especially tight to lessen the tendency for the inserts to shift under pressure, this binding problem is even more severe. Relief of the binding problem increases shifting of the inserts to create seam lines on the molded articles. Furthermore, the inserts must all be of a certain length to extend to the end of the holder, whether or not this length is actually needed for molding purposes, since the inserts would otherwise not be held securely in a conventional holder.

It is therefore an object of this invention to provide a master die assembly that for the first time, as far as is known, enables the mold or die block inserts to be of any desired length. Thus, the inserts may extend to the end of the holder, i.e. be full length, or may be half length, quarter length, or any other fractional length as needed. There is no wasted material in the insert to create a larger initial expense and to assume valuable inventory space. Yet, all of the inserts are rigidly held in place in the holder when assembled to provide excellent alignment, without shifting during the high pressure molding or die casting. If the holder is of the double or two ended type as is usual, one end can be provided with a full length set of inserts, while the other side is provided with a fractional length set.

Another object of this invention is to provide a unique master mold assembly not only free from insert shifting tendencies, but enabling the inserts to actually be quickly and simply exchanged with no binding whatever, regardless of the temperatures and pressures involved. This assembly enables the inserts to be very tightly clamped together in an accurate manner to prevent shifting and yet to enable quick release and removal from the holder at will. The inserts can be released from the holder both longitudinally and laterally of the holder to thus eliminate all binding tendencies. Yet, the novel assembly locks the inserts in position in all three dimensions, i.e. vertically, longitudinally and laterally.

It is still another object of this invention to provide a die assembly of the core-pin type, wherein the core pins can be readily exchanged for another pattern of core pins without removal of the mold assembly from the press, and in a matter of moments. The entire arrangement of core pins can be merely slid out of the end of the holder, simultaneously with removal of the ejector plate and ejector sleeves, as well as the mold block inserts. This allows substantial time saving, and increases the versatility of operation.

These and other objects of this invention will be apparent upon studying the following specification in conjunction with the drawings in which:

FIG. 1 is a perspective, exploded view of one form of the novel die assembly as used for die casting;

FIG. 2 is a top plan view of the assembly in FIG. 1 with the top portion removed;

FIG. 3 is an end, elevation, partially exploded view of the complete die assembly in FIG. 1;

FIG. 4 is a fragmentary perspective view of the mounting block connection on one of the insert blocks in the apparatus of FIGS. 1 through 3;

FIG. 5 is a fragmentary, end elevational view of a portion of the assembly showing a modified less-preferred interfitting means between the upper mold insert block and the upper portion of the holder means;

FIG. 6 is a perspective view of a novel ejection plate used with this apparatus;

FIG. 7 is a fragmentary, sectional view on one leg of the ejection plate and taken on plane VII—VII of FIG. 6;

Figure 8:
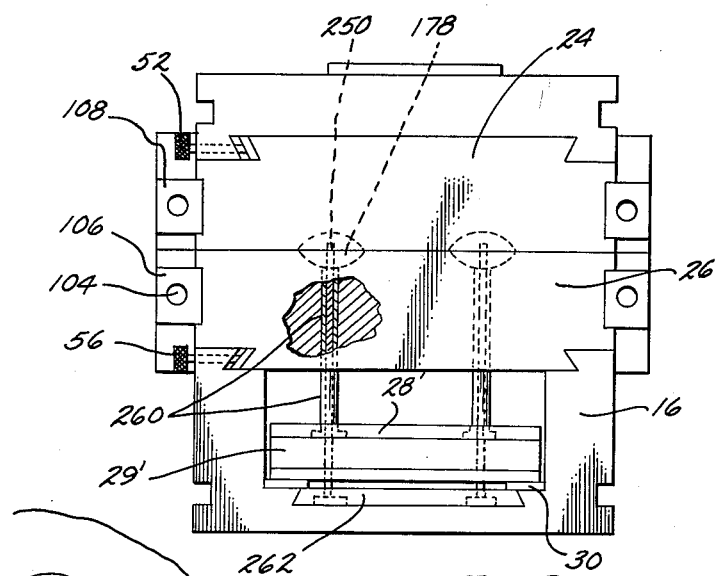
FIG. 8 is an end elevational view of a die assembly having a unique core pin and ejection sleeve assembly.

Basically, the inventive molding assembly comprises holder means including a pair of spaced, elongated parallel upper and lower portions, and a central, laterally extending transverse portion to create the general form of a reclined H, two sets of upper and lower die inserts interfitting by a unique expandible dovetail connection between the upper and lower holder portions on each side of the central portion, and novel side clamping means between the sides of the die block inserts and the central transverse holder portion. The side clamp means preferably comprises clamping block extensions mounted to opposite sides of each insert, and threaded connectors extending between these extensions and ears which project transversely from the central portion of the holding means beyond the edges of the die block inserts. The novel alignment and tightening means comprises interfitting dovetail projections and slot means between each die block and its adjacent holder portions, and a manually adjustable elongated gib between one side of the dovetail projection and slot making the slot expandable and contractable.

In one form of the invention, the assembly also preferably comprises a core pin assembly with the lower ends of the core pins mounted in a plate having a generally trapezoidal cross-sectional configuration and interfitting in a dovetail fashion with a corresponding slot in the bottom of the holder under the ejection plate and sleeves which surrounds the pins.

Referring to FIG. 1, the novel elongated die assembly 10 comprises holder means 12 which includes a central portion 14 positioned transversely of the elongated assembly, a lower portion 16 extending on opposite sides of the central portions and having a generally U-shaped cross section, and upper portion 18 extending on opposite sides of the central portion, and generally parallel to the lower portion to cooperate with the lower portion 16. The assembly also includes article ejection means 20 including ejection pins 22 arranged in a desired pattern to eject articles from mold cavities formed between the inserts, and two sets of upper and lower die block inserts 24 and 26 on one end, and 120 and 121 on the other end interfitting with and between the two ends of the upper and lower holder portions 18 and 16.

The bottom portion 16 of the holder means 12 is in the form of an upwardly-open, generally U-shaped, elongated element adapted to receive the ejector assembly 20. This assembly includes the pins 22 mounted to a mounting plate 28 which rests upon a conventional, reciprocable ejector plate 30. This ejector plate can be raised by pin means (not shown) which project through the bottom of portion 16 of the holder means in a conventional manner. In the ejector pin assembly 20, pins 22 are mounted in plate 28 and retained in place by a lower conventional holding plate 29 secured to plate 28 by bolts 31 (FIG. 3).

The lower part 14 of the central transverse portion of the holder means is affixed to the lower portion by suitable bolts (not shown). The removable upper portion 18 has an upper central portion 15 affixed thereto. Alignment of the two halves of the central portion and thus of the upper and lower portions is achieved by alignment pins 32 fitting into recesses 34. In the die coating assembly shown, a tapered sprue spreader 48 is also provided in conventional fashion. Each of the die block inserts interfits with its respective upper or lower holder means portion by means of special, interfitting, expandable dovetail projections and slots. In the form of the invention illustrated, the projections are on the die block inserts with slots being on the holder means. Thus, the wide dovetail projection 36 on the upper die block insert 24 interfits with slot 38 on upper holder means portion 18. Similarly, the lower die block 26 includes dovetail projection 40 adapted to interfit with slot 42 in the inner side walls of the lower holder means portion 16. The half-length inserts 120 and 121 on the opposite end of the assembly have like dovetail connecting and alignment means. An important part of this dovetail connection comprises the expandable and contractable nature of the slot due to the use of laterally adjustable, elongated gibs 50 and 54. Thus, when for example projection 36 is interfitted with slot 38, a susbtantial space remains between one side of each projection and slot. Into this space is placed an elongated strip or gib having the cross-sectional configuration in the form of a parallelogram having two acute angles and two obtuse angles. Lateral movement of each gib is controlled by a set of two or more set screws 52 which have one end projecting against and into the respective gib and the other end protruding out the side of the respective holder means portion to enable manual adjustment thereof. The interfit between each lower dovetail on die block 26 or 120 and the lower portion in the holder means also includes a gib 54 and a set of screws 56. These gibs and screws are on only one side of the dovetail joint. The opposite edges are accurately machined to give exact alignment between the holder and inserts when the joint is tightened by contracting the slot with inward adjustment of the gibs. Thus, expansion of the slot means by moving the gib 50 laterally outwardly frees this respective dovetail connection to allow die blocks to be readily slid longitudinally in or out of the holder means. Tightening the set screws and thus movement of the gibs inwardly in a contracting action of the slot forces the opposite side edges of the die block and holder means tightly together to provide exact and accurate alignment between them.

Alignment between the inner end face of each die block and central portion 14 or 15 is obtained by interfitting of frusto-conical projections 60 extending from opposite sides of central portions 14 and 15 and which interfit with corresponding frusto-conical cavities or recesses 61 in the front of each die block insert (FIGS. 1 and 2). Supplementary or alternative alignment means may be had between a pair of tangs 70 on opposite sides of each die block insert interfitting with corresponding grooves of the central portions 14 and 15 as illustrated in FIG. 2.

Vertical movement of ejection plate 30 is facilitated by the interfitting of opposite, laterally projecting legs 80 cooperating with vertical slots or grooves 82 in the inner side walls of lower portion 16. Each of these legs preferably has spring biased rolling means such as balls 84 (FIG. 7) retained therein. The balls 84 are retained in their cavities 90 and 92 by deforming the peripheral edges 86 and 88 of the cylindrical openings. Biasing springs 96 and 98 force the balls outwardly. The balls provide a guided roller bearing action between the ejection plate and the walls of the holder.

Longitudinal tightening and retention of the die block inserts in the holder means is achieved by a novel side clamping means 105. This clamping means utilizes integral projecting ears 100 on opposite sides of the transverse central portions 14 and 15. These ears project laterally beyond the side faces of the die block inserts, and each has longitudinally oriented threaded openings 102 on opposite sides thereof to receive elongated threaded studs 104 on each side of each die block insert. These studs fit through longitudinally oriented openings in respective clamping blocks 106 affixed to the opposite sides of each die block insert. These clamping block projections may be integral with the die block inserts, may be affixed in one position thereon, or may be adjustably mounted thereto as illustrated. More specifically, in FIG. 4 for example, block projection 108 includes a separate trapezoidal piece 110 attached to block 108 by a set of screws 112. When piece 110 is slid into a corresponding trapezoidal groove 114 formed in the side of the die block 24 to the position desired, the screws 112 are tightened to draw piece 110 tightly against the slot 114 and securely hold mounting block 108 in that position on the die block. When the die blocks are dovetailed into the holding means and the studs 104, etc. are tightened, the inner faces of the die blocks are drawn up tightly against the outer faces 118 of the central portions 14 and 15 to provide a tight seal. This novel clamping means enables the die block inserts to either be of full length to extend to the longitudinal end of the holding means, or to be of any fractional length like the half length lower and upper die block inserts 120 and 121 in FIG. 1.

*Assembly*

Initially the ejector plate 30 is lowered into the lower holder portion 16 with legs 80 in grooves 82. Then the lower central portion 14 is bolted to the holder portion 16. The ejector pin assembly includes portions underneath inserts 24 and 26 as well as 120 as illustrated in FIG. 1, to eject articles from all mold cavities 178. Next the upper central portion 15 secured to the upper portion 18 of the holding means is aligned with the lower central portion 14 by placing pins 32 into receiving orifices 34. Next the full length upper and lower die block inserts 24 and 26 are longitudinally slid into the right end of the holder with dovetail projection sliding into slot 38 and lower projection 40 fitting into slot 42. This is done with set screws 52 and 56 loosened to adjust gibs 50 outwardly and expand slot means 38 and 42 to allow the dovetail projections to smoothly and easily slide longitudinally into place. Next bolts or studs 104 are placed through the respective clamping projections 106 and 108 and threaded into openings 60 and 63 in ears 100 on the upper and lower central portions of the holding means. As these are tightened, projections 60 interfit with their respective cavities 61 to begin to align the front ends of the insert blocks. Set screws 52 and 56 are gradually tightened to press the gibs 50 and 54 against the respective dovetail elements of the insert to push the opposite sides of the insert into tight engagement with the holding means, and thereby secure the device laterally. Simultaneously, studs 104 are tightened to draw the inserts tightly into the center. This process is repeated for inserts 120 and 121.

Next, the entire assembly is clamped in a press (not shown) utilizing the conventional longitudinal grooves 150 and 152 along both sides of the upper and lower portions of the holding means. The device is then ready for ejection plastic molding, or die casting as the case may be. If used for die casting, liquid metal is injected through orifice 170, down around the tapered sprue spreader 48, through passageways 172, into the respective passageways of the inserts, through cross runners 176 and into the respective mold cavities 178.

When it is desired to exchange the particular inserts shown for others having different mold cavities, sizes and/or patterns, it is merely necessary to loosen set screws 52 and 56 to expand the dovetail slots, and loosen elongated studs 104 to enable the inserts to be readily slid from the holder means for replacement with different inserts. The side clamping means including the ears 100, studs 104, blocks 106, etc. enable the inserts to be of any desired length as needed. All of these inserts, no matter what length, are securely held against shifting and are maintained accurately aligned even under high pressures.

Referring to FIG. 5, a less preferred form of dovetail interfitting is illustrated. The elongated dovetail insert 200 is press fitted into upper holder portion 18' to enable the dovetail projection to interfit with a cooperating slot in the upper die block insert 24'. A similar side clamp means 105 is used as in the previous preferred modification. This modification is less preferred than that illustrated in FIGS. 1 through 3 since the binding problem is not so completely alleviated. It does provide accurate alignment, however.

Figure 10:
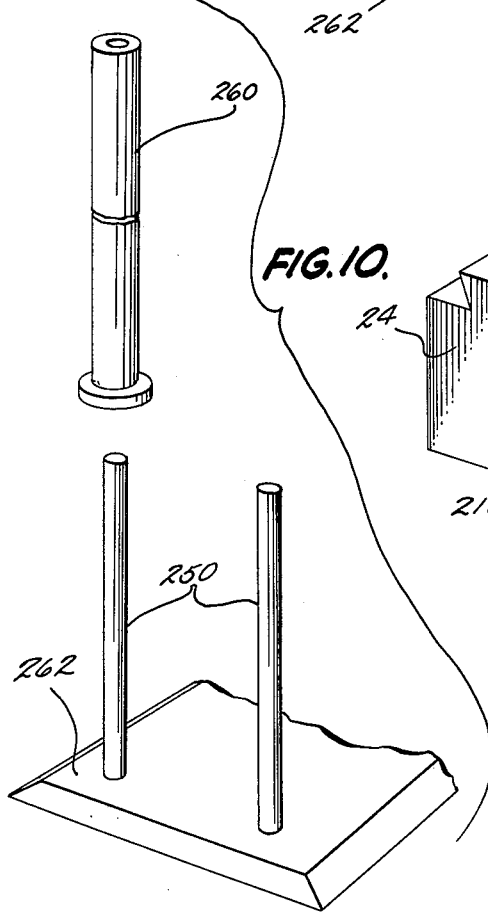
FIG. 10 is a fragmentary, perspective view of an upper die insert of a die assembly and showing an improved replaceable gate means.

Referring to FIGS. 2 and 10, a replaceable member 210 forming the inlet gate 214 to the die block passageways is there shown secured to the die block 24 by screws 212. During the die casting process, the passageway 172 leading from the inlet 170 to the die block passageway becomes worn at the gate where the inner face of the die block insert abuts the central portion 14. This place of high wear is thus replaceable by the insert 210 illustrated in FIG. 10. Although this is the preferred portion of this inventive assembly, it does not form a critical part thereof.

Figure 9:
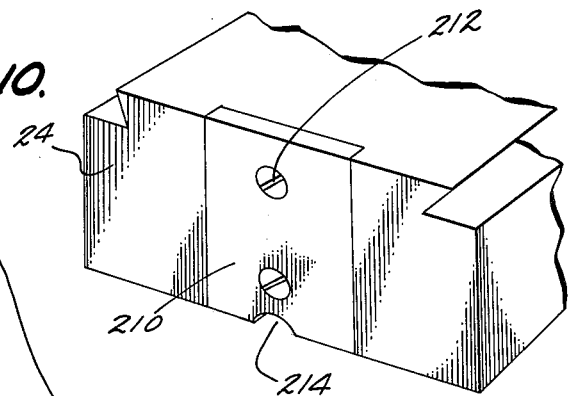
FIG. 9 is a fragmentary, perspective view of a portion of the core pin assembly in FIG. 8.

In FIGS. 8 and 9 is shown another modification of the novel die block assembly. In this form of the invention a plurality of core pins 250 have their upper ends extending into the mold cavities 178 to form hollow interiors on the molded or die cast articles. This is conventional. Also, around the pins are conventional ejection sleeves 260 having their lower expanded ends mounted between plates 28', 29' in a conventional manner. These rest upon the ejection plate 30 which is actuated from below in a conventional manner. As contrasted to the usual core pin assembly, these pins are mounted in a plate 262 which has a generally trapezoidal cross-sectional configuration and fits in a sliding dovetail into a corresponding trapezoidal slot formed in the lower inside surface of lower portion 16 of holding means 12. It will be noted that the core pin plate assembly can be readily removed from the end of the die block assembly simultaneously with the removal of the ejector sleeve and ejector plate assembly, and the die block insert. This is achieved merely by loosening the set screws 52 and 56 as previously, removing bolts 104 from the side clamps, removing any desirable holding means such as set screws against plate 262, and sliding the entire assembly out the end of the holder means to replace it by another assembly having the desired arrangement of mold cavities, ejector sleeves and core pins. Thus, it will be obvious that the device is very versatile, since any variety of mold cavity patterns with the corresponding ejector means and core pins can be replaced simultaneously and quickly without binding, with complete alignment accuracy, and in a smooth dependable operation. The particular length of the insert block does not matter. All lengths can be accommodated with the novel clamping means in a secure manner.

Other advantages of this invention will be apparent to those in the art upon studying the illustrated forms. Also, certain obvious modifications to suit a particular situation may occur to those in the art upon studying the principles involved. Thus, the invention is not to be limited to the form illustrated, but only by the scope of the appended claims and the reasonably equivalent structures to those defined therein.

I claim:

1. A die assembly comprising: elongated holder means including article ejector means, and upper and lower die block inserts; said holder means including an upper portion in interfitting engagement with said upper die block insert, a lower portion in interfitting engagement with said lower die block insert, and central transverse portions abutting the ends of said die block inserts; each of said interfitting engagements comprising a slidable dovetail projection means and cooperating slot means oriented longitudinally of said elongated holder means and providing lateral alignment as well as lateral and vertical stability; clamping projections secured to both sides of each die block insert; and tightening means extending between each of said projections and said central transverse portions to hold said inserts tightly against said central transverse portions and provide longitudinal stability.

2. A mold assembly comprising: elongated holder means including article ejector means, and upper and lower die block inserts; said holder means including an upper portion in interfitting engagement with said upper die block insert, a lower portion in interfitting engagement with said lower die block insert, and central transverse portions abutting the ends of said die block inserts; each of said interfitting engagements comprising a slidable dovetail projection means and cooperating slot means oriented longitudinally of said elongated holder means and providing lateral alignment as well as lateral and vertical stability; and tightening and clamping means between each of said projections and said holder means to draw and hold said inserts longitudinally tightly against said central transverse portions.

3. A mold assembly adapted to receive die block inserts of full or fractional length, comprising: elongated holder means including article ejector means, and upper and lower die block inserts; said holder means including an upper part slidingly interfitting with said upper die block insert, a lower part slidingly interfitting with said lower die block insert, and central transverse parts abutting the ends of said die block inserts; vertical and lateral alignment means between each of said inserts and said holder means; clamping projections mounted securely on both sides of each die block insert; and tightening means extending between each of said projections and said central transverse parts to hold said inserts of whatever length tightly against said central transverse parts.

4. In a master die assembly having holder means including central transverse portions, and spaced, parallel upper and lower portions extending from said transverse portions on opposite sides thereof, a pair of cooperating upper and lower die inserts between said upper and lower holder portions on each side of said central transverse portions; vertical and lateral alignment means between said inserts and holder means; said central transverse portions having ears projecting laterally beyond the sides of said inserts; clamping projections mounted securely to opposite sides of each insert; and threaded elongated stud tightening means extending between each clamping projection and its respective ear to enable insert blocks of any length to be tightly drawn and securely held against said central transverse portions.

5. A mold assembly comprising: elongated holder means including article ejector means, and upper and lower die block inserts; said holder means including an upper part interfitting with said upper die block insert, a lower part interfitting with said lower die block insert, and central transverse parts abutting the ends of said die block inserts; said interfitting upper part and upper insert having cooperative longitudinally oriented dovetail projection and slot means, and said interfitting lower part and lower insert having cooperative longitudinally oriented dovetail projection and slot means; each of said dovetail slots including a laterally expandable edge portion, and adjustment means in operative engagement with each of said edge portions allowing smooth, free insertion and removal of said inserts when expanded, and causing exact lateral and vertical alignment and tight securement when contracted; and longitudinally extending clamping means between each of said die blocks and said holder means.

6. A mold assembly comprising: elongated holder means including article ejector means, and upper and lower die block inserts; said holder means including an upper part interfitting with said upper die block insert, a lower part interfitting with said lower die block insert, and central transverse parts abutting the ends of said die block inserts; said interfitting upper part and upper insert having a dovetail projection and slot means oriented longitudinally of said elongated holder, and said interfitting lower part and lower insert having a dovetail projection and slot means oriented longitudinally; each of said dovetail slots including a laterally expandable and contractible edge portion, and manual adjustment means in operative engagement with each of said edge portions and extending out the side of said holder means, thereby allowing smooth free insertion and removal of said inserts when expanded, and causing exact lateral alignment and tight securement when contracted; said transverse parts having ears projecting laterally beyond the sides of said inserts; clamping projections mounted securely to opposite sides of each insert; and threaded tightening means extending between each clamping projection and its respective ear to enable insert blocks of any length to be aligned and tightly drawn and held against said central transverse parts.

7. A mold assembly comprising: elongated holder means including article ejector means, and upper and lower die block inserts; said holder means including an upper part interfitting with said upper die block insert, a lower part interfitting with said lower die block insert, and central transverse parts abutting the ends of said die block inserts; a plurality of longitudinal projections interfitting with corresponding recesses between each of said inserts and said central transverse parts to provide exact lateral and vertical alignment therebetween; said upper part and upper insert having an interfitting expandable and contractible dovetail projection and slot means oriented longitudinally of said elongated holder, and said lower part and lower insert having an interfitting expandable and contractible dovetail projection and slot means oriented longitudinally of said elongated holder; clamping means mounted securely on both lateral sides of each die block insert, and tightening means extending between each of said blocks and said central transverse parts to draw and maintain said inserts of whatever length tightly against said central transverse parts.

8. A mold assembly comprising: elongated holder means including article ejector means, and upper and lower die block inserts; said holder means including an upper part interfitting with said upper die block insert, a lower part interfitting with said lower die block insert, and central transverse parts abutting the ends of said die block inserts; said upper part and upper insert having an interfitting dovetail projection and slot means oriented longitudinally of said elongated holder means, and said lower part and lower insert having an interfitting dovetail projection and slot means oriented longitudinally of said elongated holder means; an elongated, transversely-adjustable gib oriented longitudinally of said holder means and positioned between one wall of each of said dovetail projections and slot means, and a plurality of manual adjustment set screws in contact with each gib and extending out the side of said holder, allowing ready insertion and removal of said inserts when in one lateral position of said gib and causing exact lateral alignment and tight securement in another lateral position of said gib; and longitudinally extending clamping means between each of said die blocks and said holder means.

References Cited in the file of this patent

UNITED STATES PATENTS

| | | |
|---|---|---|
| 1,644,588 | Heltzel | Oct. 4, 1927 |
| 1,891,894 | Lester | Dec. 20, 1932 |
| 2,156,459 | Mucher | May 2, 1939 |
| 2,358,857 | Gits | Sept. 26, 1944 |
| 2,493,069 | Judisch | Jan. 3, 1950 |
| 2,541,923 | Huxham | Feb. 13, 1951 |
| 2,574,223 | Nichols | Nov. 6, 1951 |
| 2,770,011 | Kelly | Nov. 13, 1956 |
| 2,783,502 | Abplanalp | Mar. 5, 1957 |
| 2,863,187 | Van Dusen et al. | Dec. 5, 1958 |
| 2,881,478 | Gruenberg | Apr. 14, 1959 |
| 2,956,321 | Halward | Oct. 18, 1960 |
| 3,070,857 | Venus | Jan. 1, 1963 |